July 10, 1973     B. E. HALEY     3,745,016

PROCESS FOR PURIFYING SUGAR BEET DIFFUSION JUICE

Filed July 22, 1971     2 Sheets-Sheet 1

United States Patent Office 3,745,016
Patented July 10, 1973

3,745,016
PROCESS FOR PURIFYING SUGAR BEET
DIFFUSION JUICE
Boyd E. Haley, Moses Lake, Wash.
(428 W. Spring St., West Haven, Conn. 06516)
Filed July 22, 1971, Ser. No. 165,031
Int. Cl. A23k 1/00; A23j 1/16
U.S. Cl. 99—2 R
4 Claims

ABSTRACT OF THE DISCLOSURE

A process for recovering a high protein animal feed from a sugar beet diffusion juice containing high protein colloidal and particulate solids is disclosed in which the juice is treated with a pH adjusting material to raise the pH of the juice to a pH of 6.5 to 7.0 without precipitating soluble impurities contained therein. The juice is then heated to a temperature of 75°–95° C. to denature the protein material. The heated diffusion juice is then subjected to centrifugal forces of between 10,000 $g$'s and 100,000 $g$'s to separate the colloidal particulate content from the diffusion juice. The separated solids are partially dried by subjecting the solids to centrifugal forces between 10,000 $g$'s and 100,000 $g$'s to reduce the moisture content of the solids below 50% by weight. The partially dried solids are dried by evaporation to form a dried high protein animal feed having a moisture content of between 5% and 12% by weight.

BACKGROUND OF THE INVENTION

This invention relates to beet sugar manufacture and more particularly to by-product recovery of impurities removed from the diffusion juices during purification.

Generally modern beet sugar manufacture is conveniently separated into six stages or basic steps: (1) diffusion, (2) juice purification, (3) evaporation, (4) crystallization, (5) dried-pulp manufacture and (6) recovery of sugar from molasses.

The composition of sugar beets varies widely, depending on the genetic strain, agronomic factors of soil and fertilization, weather conditions during growth, incidence of plant disease, degree of maturity and the treatment between harvesting and slicing. The percentage of sugar in mature beets ranges from 10–22% with between 15–16% being the medium values. A mature beet generally contains about three-quarters water. The beet has a liquid or juice phase and an insoluble or solid phase. The juice contains approximately 25% by weight of dissolved solids, the largest component of which is sucrose.

The other water-soluble organic constituents are separated into equal quantities of nitrogenous and nitrogen-free compounds. Included iln the nitrogen-free compounds besides sucrose, are small amounts of glucose and fructose and raffinose and kestones. Traces of arabinose and galactose are also present. Organic acids include various mono-, di- and tricarboxylic acids (both unsubstituted and hydroxy acids). The juices also contain pectic material, saponins and vegetable fats made up of lecithin oleic, palmitic and erucic acids.

The largest fraction of nitrogenuous compounds is protein. The nitrogenous organics, which cannot easily be coagulated or precipitated, are generally classed as "interfering" or "harmful" nitrogen. The organic base, betaine, is the largest individual component, followed by the amides mostly glutamine and asparagine-amino acids, purines, pyrimidines, and ammonia and nitrate.

The inorganic constituents, totaling about 0.5% of the whole beet, include the cations of potassium, calcium, magnesium and sodium and anions of phosphate, chloride and sulfate.

A combined flow and illustrated apparatus schematic is shown in FIG. 1 of the typical modern plant for diffusion and diffusion juice purification.

Initially clean sugar beets are run through a beet slicer 10 to form long, thin strips or cossettes 11. After weighing, the cossettes pass into a continuous diffuser 12 usually of the slope-type to extract the sugar from the cossettes with a warm water solvent from a water supply 14. The cossettes are propelled up the slope by scolls with perforated plate flights. The solvent (warm water) enters at the top of the diffuser and percolates by gravity through the cossette mass, leaching out the sucrose and the water soluble materials as the solvent proceeds countercurrent to the cossettes. Generally, the diffuser 12 is heated by steam to increase the extraction efficiency of the solvent. Detrimentally, however, the increased temperature causes additional amounts of colloidal matter, especially pectins, to be added to the juice. The sucrose enriched juice leaving the diffuser 12 is known in the industry as diffusion juice or raw juice. The depleted cossettes leaving the upper end of the diffuser are known as pulp. The diffusion process is approximately 98% efficient with the dffusion juice containing between 10–15% sucrose.

Wet pulp from the diffuser 12 is run to pulp presses 13 where the mositure content is reduced from about 95% to between 75% and 85%. After the addition of concentrated Steffen filtrate or molasses, or both, the pressed pulp is dried to a moisture content of between 5% to 12% by hot air in a pulp drier 15. The pulp drier generally consists of a horizontal rotating drum in which the pressed pulp is passed continuously through the drum. The dried cosette pulp is generally sold as a ruminant animal feed.

The importance of fuel used in the pulp drier operation is paramount. Of the total fuel required by the entire beet factory, approximately 30% is used in drying pulp. Any savings in fuel by astute operations or by lowering the moisture content of the pressed pulp will yield substantial savings in fuel consumption. The addition of highly dry-material to the pressed pulp reduces the load on the dryer per volume of dried feed produced.

The diffusion juice is clouded and contains a considerable amount of colloidal and particulate solids. The color of the diffuser juice is usually gray and changes to a dark gray or almost black hue on contact with air. The diffuser juice normally has a pH of between 6.2 and 6.5 and leaves the diffuser at a temperature of between 60–70° C.

The nonsucrose content of the diffusion juice is related to the quality of the beets and the conditions under which the sugar is extracted in the factory. Besides the water and sucrose, the diffuser juice contains solid impurities which are freely dissolved, suspended particulate or colloidal in nature. The colloids and suspended particulate, in particular, make it very difficult to concentrate the diffusion juice or to crystallize pure sucrose from the juice. The inverted sucrose (glucose and fructose) in the juice normally ranges from 0.4 to 0.8% of the dissolved solids.

The chief aim of juice purification is to efficiently remove the impurities from the juice so that a high quality white sugar can subsequently be formed with a minimum of sugar loss in the molasses or in the impurities removed. Generally, the actual operating conditions of the juice purification process is a compromise between obtaining a good quality thin juice and ease of sludge or lime mud separation.

Since the late 1800's, the classical process for purifying or defecating the diffusion juice has been the lime-carbon dioxide purification process which includes the steps of: (1) pre-liming or predefecation, (2) main-liming (3) first carbonation and (4) second carbonation.

Prior to pre-liming, the diffuser juice is usually screened to remove the suspended large particles and heated to an elevated temperature in a juice heater.

The purpose of pre-liming is to alkalize the juice to stabilize the colloidal and particulate material at a pH of 8.0 to 8.3 and to precipitate certain non-sugars, among which are organic acids with relatively insoluble lime salts such as phosphate and sulfate, proteins, and their moieties and colloidal substances which are not adequately removed in main-liming. Generally, this is appreciably accomplished by the addition of a liming agent of between 0.2–0.3% CaO by weight to the juice. The lime is added in the form of saccharate milk or milk of lime. The precipitate produced in pre-liming includes both ionic and colloidal types. The first ionic reaction of lime is the neutralization of acidity. Since the solubility of the formed lime salts are rather low, large amounts of lime are not required. The colloidal reactions of the protein and pectins are quite complicated and difficult to predict.

Proteins and pectin materials of the diffusion juice when precipitated with lime form a colloidal slimy precipitate which settles very slowly and is extremely difficult to filter. Furthermore, proteins are able to depress the activity of the calcium ion and increase the apparent solubility product of calcium carbonate during carbonation. Pre-liming, if properly conducted, provides for the effective coagulation of proteins. When the lime is added rather slowly a somewhat more compact precipitate forms which settles somewhat more readily and is somewhat easier to filter. On an overall basis, approximately 10% of the total CaO utilized in the purification process is added to the screened diffusion juice during pre-liming.

The main-liming step includes the addition of excess amounts of CaO (approximately 60–80% excess) to the diffusion juice to substantially increase the pH of the juice to destroy inverted sugar or to effect the saponification of amides and increase sedimentation and filterability of the precipitate during the first carbonation. Large quantities of CaO are added to the juice, between 2% and 3% by weight of the juice, to complete the destruction reaction and to combine with $CO_2$ to form substantial amounts of $CaCO_3$ precipitate during first carbonation to act as a filter aid to increase sedimentation and filterability of the conglomerate precipitate or sludge. General practice is to heat the pre-limed diffusion juice to about 85° C. The advantage of mainliming, with the conditions of high pH, high temperature and high residence time for completion of destruction reaction, is that the purified juices are more thermostable.

After the liming, when all the possible reactions between lime and non-sugars have taken place, the third fundamental step of first carbonation is introduced. The objective of the first carbonation step is to precipitate with carbonic acid (added as $CO_2$) the excess of lime added to the juice and bring the alkalinity of the juice to a desired low level of about 0.1% CaO. The precipitated calcium carbonate is important for two reasons; (1) to be a reagent for further chemical purification of the juice, and (2) to act as a filter aid. These two uses make opposing demands on the physical quality of the precipitate formed. To obtain optimum chemical purification, it is desirable to have the calcium carbonate form with a high surface area ratio. However, the rate of filtration and sedimentation are lowered with increased surface area ratios. An increase in the size of the calcium carbonate precipitate, results in a lower surface area ratio but greatly favors sedimentation and filtration. The physical form of the calcium carbonate precipitate depends upon the initial alkalinity of the juice before carbonation, the drop of alkalinity during first carbonation and on the final alkalinity at the conclusion of the first carbonation, the better is the quality of the thin juice produced. However, the lower the alkalinity, the larger the crystalline agglomerates and the more easily the carbonation sludge can be settled and filtered. The carbonation is generally accomplished by gasing $CO_2$ through the solution. The Dorr system is the most used system for accomplishing the main-liming and first carbonation.

In this system, the diffusion juice, after passing through a diffusion juice heater 16 enters the primary tank 18 which overflows into a secondary tank 20. The liming agent is added to the overflow through line 19. The limed juice flows down through the secondary tank 20 in which it is treated with carbon dioxide gas from line 21. The contents of the secondary tank 20 are continuously recirculated from the bottom of the secondary tank into the bottom of the primary tank. The pH or alkalinity is kept at a desired point of control of either the carbon dioxide gas or the liming agent. Treated juice overflows from the first carbonization system into a Dorr multitray thickener 22, where primary separation of the precipitated solids from the juice is effected.

The choice of size of the first carbonation thickener 22 is very important. The settling of the first carbonation sludge in a Dorr thickener 22 is effected by many variables including: temperature, alkalinity of first carbonation juice, and amount of lime added and retention time. A prolonged retention time is damaging to juice quality. Often water-soluble polymers are added to the thickeners as settling aids to promote the flocculation and thickening of lime and calcium carbonate sludge.

The overflow of the thickener 22 is then subjected to second carbonation in a tank 37. The purpose of second carbonation is removal of the lime remaining in solution in the juice. Carbon dioxide gas is passed through the thin juice by line 40 to form a calcium carbonate precipitate. Since second carbonation takes place at a lower pH than the first carbonization, the calcium carbonate crystals are larger and are easily filterable. Usually Kelly filters 42 are used for this task. The amount of sludge produced during the second carbonation is about 5% of the amount of sludge produced during the first carbonization. The filter is then treated with a small amount of sulfur dioxide in an $SO_2$ tower 44 to inhibit color-increasing reaction. After sulfitation the juice is known as thin juice.

The thin juice is heated by a thin juice heater 41 and sent to evaporators to evaporate much of the water from the dissolved sugar content. By evaporation, the percentage of dissolved solids in the juice is raised from 10–15% to 50–65%. The overflow from the last evaporation is called thick juice.

The thick juice is then fed to vacuum pans where the liquid is boiled at low temperature to avoid inversion and caramelization to start the formation of sugar crystals. The liquor is either shocked to start crystal formation by the small addition of powdered sugar or it is seeded with finely-milled sugar in a slurry of isopropyl alcohol. When the crystals are of the desired size and number, the mass of crystals and mother liquor, known as massecuite is then discharged from the vacuum pans into a large mixer. From the mixer the massecuite is fed to centrifugals. The centrifugal is in essence, a perforated basket which rotates around a vertical axis at high speeds within an outer collector shell. The liquid surrounding the crystals is spun off and leaves the basket through the perforators. The remaining crystals are then granulated.

During the purification process a substantial amount of the sucrose is entrained in the first carbonation sludge. The first carbonation sludge is removed from the thickener in an underflow line 28. The underflow line passes the sludge rotary drum vacuum filters 30 to remove the juice from the solid material. The solid material forms a waste lime cake or lime mud cake which is subsequently washed several times to re-dissolve the entrained sugar. The waste lime cake contains about 75% calcium carbonate, 6% organic nitrogen compounds, including organic acids such as citric acid, 4% of the mineral compounds, a small amount of phosphoric acid equivalent and any filter aids that are discarded with the waste lime. Generally, the waste lime cake is dumped in a lime pond 34 to be sun baked. The dried waste lime cake, because of its high concentration of calcium carbonate, is sometimes processed through a reclaiming kiln to regenerate lime and $CO_2$ gas. No attempt is made to recover the organic matter of the cake other than to use it as a partial fuel source for drying and calcining in the reclaiming kiln.

One of the principal objects of this invention is to provide a by-product process for recovering a high protein animal feed from sugar beet diffusion juice during a selective purification of the juice without adversely affecting the sugar production therefrom.

An additional object of this invention is provided a process for recovering a high protein animal feed from sugar beet diffusion juice utilizing centrifugal forces to produce an efficient separation of colloidal and particulate solids from the juice.

It is well recognized that prior workers in the art have suggested the application of centrifugal forces in performing liquid-solid separations in the purification of diffusion juice in the manufacture of beet sugar. U.S. patents to Christianson 968,327; Foster, 1,897,424 and Jiskra 3,114,655 suggest the use of centrifugal forces to separate insoluble calcium salts and colloidal materials from the diffusion juice after the addition of liming agents to form insoluble calcium salts. The Jiskra patent suggests that the resulting mud could be further processed to recover an animal feed material. However specific procedures would have to be devised to separate the organic protein materials from the calcium salts. Whereas with the applicant's invention no such subsequent separation is required.

U.S. patents to Homans 978,750; Berge 1,839,733; Gaiennie et al. 2,992,140 and Katzen et al. 3,501,346 suggest the use of a centrifuge in place of a vacuum filter to remove sugar juice from the clarification lime mud. As an improvement the U.S. patent to Eakin 2,610,932 suggests centrifuging the filtrate from the vacuum filters to remove solids not taken out by the vacuum filters, U.S. patent to Lingren 2,478,971 suggests centrifugally purifying the sugar juice during the purification process.

The early U.S. patent to Kipke 1,101,940 suggests centrifuging the raw diffusion juice as it comes from the diffuser to remove the insoluble impurities. The early U.S. patent to Coombs 1,156,060 suggests heating a sugar juice under pressure to defecate the juice and thereafter centrifugally separating the defecated liquid from suspended impurities.

However none of these prior art teachings suggest the unique selective centrifugal separation of the colloidal and particulate solids from the juice without the other impurities or insoluble lime salts, in which the colloidal and particulate solids are partially dried during the separation.

An additional object of this invention is to provide a process for selectively purifying sugar beet diffuser juice to produce a high protein feed from a portion of the impurities in which the removed impurities require no subsequent separation other than the drying to form the feed.

A further object of this invention is to provide such a process for selectively purifying a sugar beet diffuser juice in which a valuable by-product is formed with a minimum of subsequent processing.

An additional object of this invention is to provide a process for purifying sugar beet diffuser juice which enhances the advantages of using heretobefore marginal purifying methods such as ion exchange or ion exclusion resins and activated carbon. Heretofore ion exchange or ion exclusion resins have not been usable because of fouling and plugging caused by colloidal materials.

A further object of this invention is to provide such a purification process which increases the flexibility of the overall sugar recovery process to respond to fluctuations in the quality of the sugar beet and other process variables.

An additional object of this invention is to reduce the pollution problems associated with the manufacture of sugar from sugar beets.

These and other objects and advantages of this invention will become apparent upon the reading of the following detailed description of this invention.

BRIEF DESCRIPTION OF THE DRAWINGS

A preferred embodiment of this invention is illustrated in the accompanying drawings, in which.

DETAILED DESCRIPTION OF THE INVENTION

Broadly, this invention involves an improved purification process for purifying raw sugar beet diffuser juice in which the colloidal and particulate material are separately removed from the juice and the soluble impurities and is recovered as a valuable by-product. The colloidal and particulate removal is accomplished by first adjusting the pH of the raw diffuser juice to a pH of between 6.5 and 7.0 to minimize the formation of inverted sucrose and stabilize the colloids. At this point flocculating agents may be added to aid in coagulation of the colloids. If the pH of the raw juice is 6.5 or slightly above then it may not be necessary to add any pH adjusting agent. It is important not to add excess pH adjusting agent that would cause precipitation of any of the soluble impurities. Small amounts of $Ca(OH)_2$ or NaOH producing materials may be utilized as pH adjusting agents. Frequently, it may be desirable to heat the raw juice either simultaneously or subsequently to the neutralization to decrease the solubility of the protein in the juice i.e. denature the protein material. The next step involves the separating of the colloidal and particulate solids from the raw diffusion juice by centrifuging the juice at high centrifugal forces greater than 10,000 times the force of gravity (abbreviated 10,000 $g$'s) and preferably between 10,000 $g$'s and 100,000 $g$'s to form a clarified diffusion juice.

The separated colloidal and particulate solids are maintained subjected to the centrifugal forces until the moisture content associated with the solids is reduced to below 50% by weight to form a partially dried pulp. Preferably the separated colloidal and particulate solids are subjected to the high centrifugal forces until the moisture content of the formed pulp is below 30% or less by weight. Alternatively the separated colloidal and particulate solids may be physically removed from the clarified diffusion juice and washed with a sucrose solvent such as water to remove any retained sucrose and then subject the solids to high centrifugal forces to remove the moisture content to below 50 % by weight. The partially dried pulp is then further dried by evaporation of most of the moisture to form a dried high protein edible feed having a moisture content of between 5% and 12% by weight.

The clarified diffuser juice is treated to remove the dissolved impurities. The dissolved impurities may be removed by treating the clarified diffuser juice with lime and $CO_2$ in the defecation or purification process of defeco-carbonation.

Figure 1:
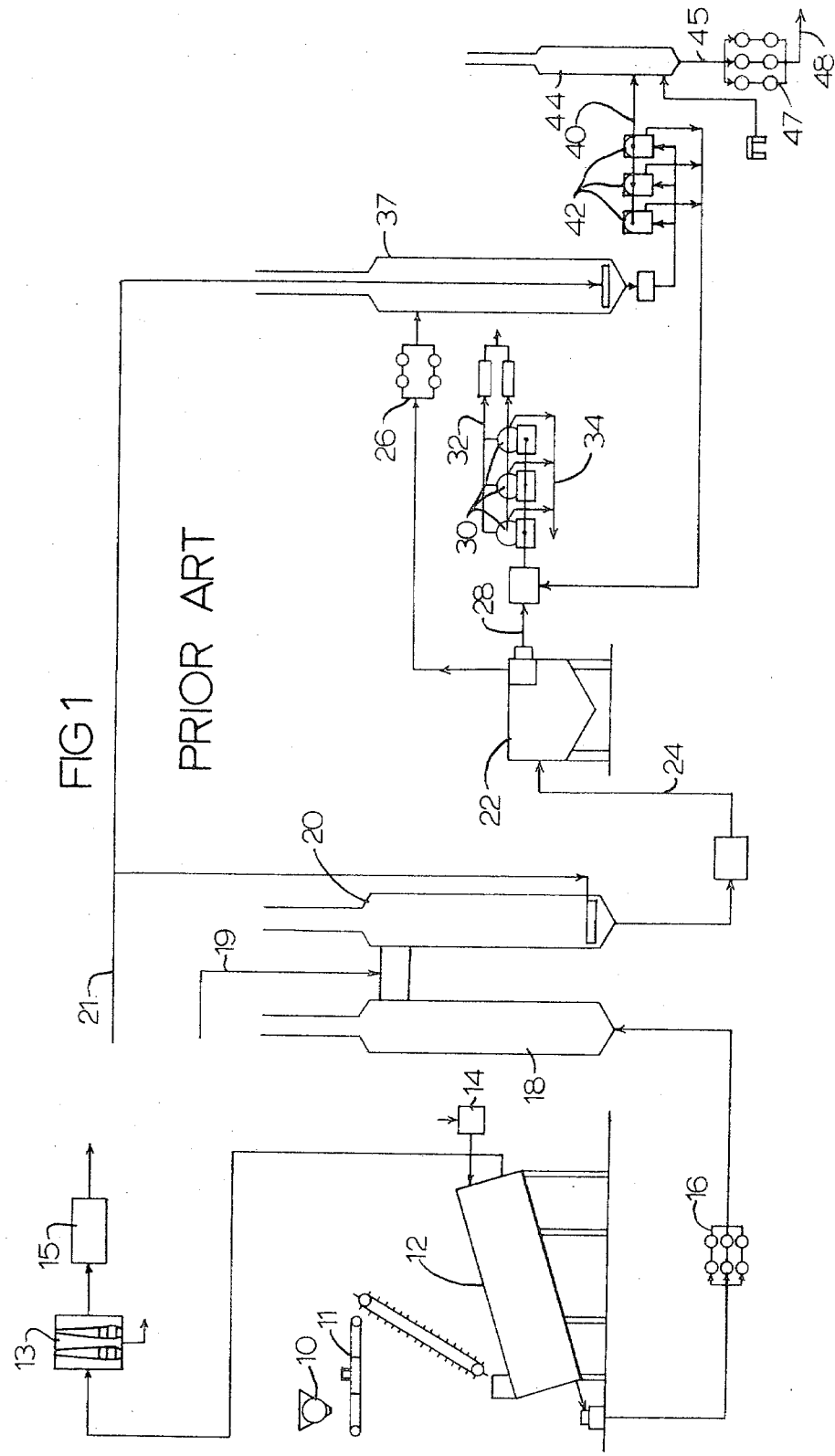
FIG. 1 is a schematic flow diagram of a modern-day beet sugar manufacturing plant considered to be prior art.
Figure 2:
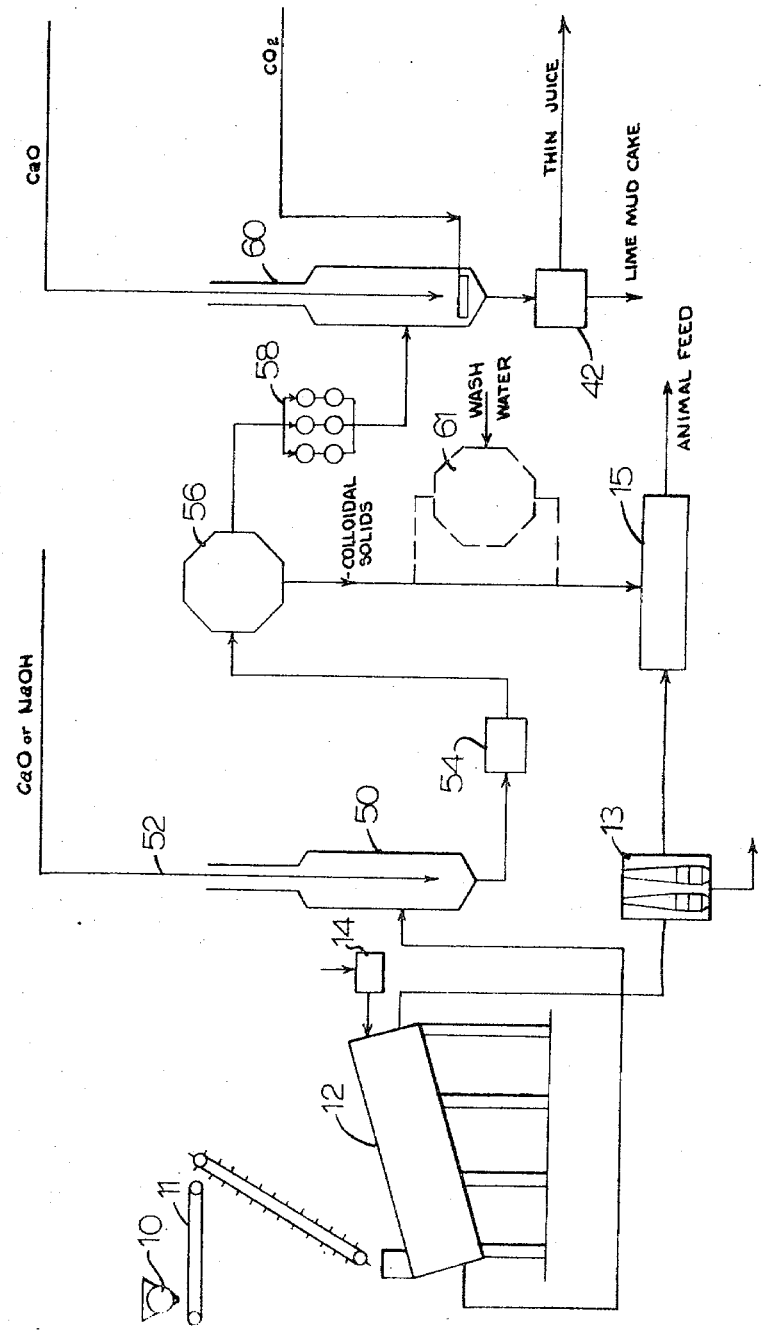
FIG. 2 is a schematic flow diagram of a preferred embodiment of this invention.

As shown in FIG. 2 the screened diffusion juice emitted from the diffuser is directed into a neutralizing tank 50 in which lime or NaOH from line 52 may be added to adjust the pH of the juice to a pH of between 6.5 and 7.0 to minimize the formation of glucose and fructose by inversion of sucrose and to stabilize the colloids without precipitating the dissolved impurities. Flocculating agents may be added in the neutralizing tank 50. Generally, the raw diffuser juice has a pH of between 6.2 and 6.5 and a temperature of between 60° and 75° C. If the pH of the diffuser juice is 6.5 or slightly above, the juice may be processed without pH adjustment. From the neutralizing tank the diffuser juice passes through a raw juice heater 54 to raise the temperature of the neutralized raw diffuser juice to a temperature between 75° C. and 95° C. to denature the soluble protein and decrease protein solubility in solution. The temperature may vary depending upon the juice quality. The heated neutralized diffuser juice is then passed on a continuous basis through a high capacity, high speed, solids-ejecting centrifuge 56 that subjects the raw juice to acceleration forces greater than 10,000 g's. Preferably, the juice is subjected to acceleration forces of between 10,000 g's and 100,000 g's. For most production operations each continuous solids-ejecting centrifuge 56 should have a capacity of efficiently handling approximately 200 g.p.m.

From the centrifuge 56 the clarified raw diffuser juice is further purified by conventional defecation methods or by new methods made possible by this invention to remove the soluble impurities from the juice. In FIG. 2 the clarified diffuser juice passes through a juice heater 58 to a liming tank 60. The amount of lime that is needed to purify the clarified diffusion juice of the soluble impurities and many possible remaining colloidal impurities is considerably less than was required by conventional methods. The decrease in lime is made possible by the removal of the colloidal and particulate material. Otherwise the colloidal and particulate matter would react with lime to form a gelatinous precipitate which is very difficult to filter. Consequently, the amount of $CO_2$ needed is also considerably reduced. Under some circumstances, it may be possible to delete the liming and carbonation steps altogether, leaving just the pre-liming procedure.

One of the most important steps of this process is the step of subjecting the separated colloidal and particulate solids to high centrifugal forces for a duration sufficient to decrease the moisture content associated with the solids at least below 50% by weight so that the partially dried solids can be added directly to the pressed cossette pulp to reduce the heat load on the pulp drier 15 and thereby increase the volume of dried feed produced per heating unit. Alternatively the high protein pulp from the centrifuge 56 may be dried in a separated pulp dried to produce a selected high protein feed material. The cost of producing (drying) such selected high protein feed material is considerably less than the feed produced from the diffused cossettes, since much of the moisture is removed during the centrifuging.

Under some conditions, it may be desirable to perform the separation of the colloidal and particulate solids from the solution and the partial drying of the separated solids in separate centrifuges. As shown in dotted line FIG. 2, the solids ejected from the centrifuge 56 may be directed to a second centrifuge 61 for partial drying. It may also be desirable to add wash water to the second centrifuge 61 to remove any entrained dissolvable sucrose as the solids are being partially dried. The second centrifuge 61 subjects the solids to centrifugal forces of between 10,000 g's and 100,000 g's for a duration sufficient to reduce the moisture content to below 50% by weight and preferably down to less than 30%. After the solids are ejected from the centrifuge 61 and passed to the pulp drier 15 for final drying to form a dried high protein feed containing between 5% and 12% moisture by weight.

As previously mentioned, in the conventional process the colloidal solids are removed from the juice as part of the lime and cake with no recovery of the colloidal solids (high in protein) other than as a source of fuel for the lime reclaiming kiln.

By utilizing the above process it was found that the colloidal solids removed by the centrifuge averaged 0.6–0.7% by weight of the raw diffuser juice. This means approximately 6–7 tons of high protein livestock feed can be obtained from every 1,000 tons of raw diffuser juice processed. For some sugar beet plants this represents a substantial increased income from the sale of the recovered solids. Moreover, large savings are also realized in the use of considerably reduced amounts of lime and $CO_2$ to defecate the juice. By utilizing this process, savings between 10% and 90% less lime and $CO_2$ will be realized which represents large annual savings.

In comparison tests in which the clarified diffusion juice obtained from the centrifuge was compared with equal amounts of the normal non-centrifuged diffuser juice prior to pre-liming, it was found that it took 10–15% less lime to remove the black or dark color from the centrifuged diffusion juice than the non-centrifuged diffusion juice. It took approximately six times more lime with the non-centrifuged diffusion juice to obtain a filterable juice as it did with the centrifuged juice. Even with the addition of six times as much lime to the non-centrifuged diffusion juice, filterability rate was considerably slower than the centrifuged juice.

In other filterability tests, using a Buchner funnel with vacuum, only approximately 20 drops of non-centrifuged diffusion juice could be filtered through a 3-inch diameter white crepe filter paper before the filter paper became plugged. In comparison, over 120 ml. of centrifuged diffusion juice passed through a 3-inch diameter white crepe filter without plugging the filter. It was found that the diffusion juice that has been passed through the centrifuge prior to pre-liming could be readily filtered without any filter aid.

The utilization of this process has many downstream benefits by removing the colloids prior to the precipitation (pre-liming) of the soluble impurities. Over and above the substantial savings of lime and $CO_2$, considerable less filtering capacity is required to remove the precipitate from the juice after defecation. Furthermore, the advantages of alternate purification techniques such as ion exchange, ion exclusion or activated carbon absorption are greatly enhanced.

Of no small benefit is the ability of the invention to reduce the water and air pollution problem associated with present day beet sugar manufacture. Since considerably less lime and $CO_2$ is required to purify the diffusion juice, the amount of particulate material passing to the atmosphere from the limestone kiln will be correspondingly reduced. There is less need for a lime reclaiming kiln when utilizing the process.

It should be understood that the above described process may be varied to accommodate the needs of a particular installation and to suit local conditions and a wide variety of diffusion juice quality. Therefore, only the following claims are intended to refine this invention.

What is claimed is:

1. In the manufacture of beet sugar, a purification by-product process for forming a high protein feed from the high protein colloidal and suspended particulate impurities contained in sugar beet diffusion juice while clarifying the diffusion juice, comprising the steps of:

adjusting the pH of the diffusion juice to a pH of between 6.5 and 7.0 to neutralize the diffusion juice and stabilize the colloidal and suspended impurities;

heating the neutralized diffusion juice to a temperature of 75–95° C. to denature the protein material;

subjecting the neutralized and heated diffusion juice to centrifugal forces of sufficient magnitude to separate the colloidal and suspended impurities from the juice to form a clarified diffusion juice;

subjecting the separated colloidal and suspended particulate impurities to centrifugal forces of sufficient magnitude to form a pulp having a moisture content of less than 50% by weight; and heating the pulp to evaporate moisture from the pulp to form a high protein feed.

2. In the process as defined in claim 1 wherein the separated colloidal and suspended particulate impurities are subjected to centrifugal forces between 10,000 and 100,000 times greater than the force of gravity to reduce the moisture content therein to less than 50% by weight.

3. In the process as defined in claim 1 wherein the separated colloidal and suspended particulate impurities are subjected to centrifugal forces of sufficient magnitude to form a pulp having a moisture content of approximately 30% by weight or less.

4. In the process as defined in claim 1 wherein the pulp is heated to evaporate sufficient moisture to form a dry high protein feed having a moisture content of between 5% and 12% by weight.

References Cited

UNITED STATES PATENTS

| | | | |
|---|---|---|---|
| 2,774,693 | 12/1956 | Brieghel-Müller | 127—50 |
| 1,988,923 | 1/1935 | Treatini | 127—50 |
| 1,876,491 | 9/1932 | Foster | 127—50 |
| 1,954,566 | 4/1934 | Foster | 127—48 |
| 738,328 | 9/1903 | Hignette | 127—56 |
| 1,156,060 | 10/1915 | Coombs | 127—56 |
| 1,897,424 | 2/1933 | Foster | 127—56 |

FOREIGN PATENTS

| | | | |
|---|---|---|---|
| 470,797 | 8/1937 | Great Britain | 99—2 |
| 2,092 | 7/1869 | Great Britain | 99—2 |

NORMAN YUDKOFF, Primary Examiner

C. P. RIBANDO, Assistant Examiner

U.S. Cl. X.R.

99—17; 127—50, 56